United States Patent
Atherton et al.

(10) Patent No.: US 11,908,017 B2
(45) Date of Patent: *Feb. 20, 2024

(54) DOCUMENT CREATION SYSTEM AND METHOD UTILIZING OPTIONAL COMPONENT DOCUMENTS

(71) Applicant: Hartford Fire Insurance Company, Hartford, CT (US)

(72) Inventors: Kristin Elizabeth Atherton, Charlotte, NC (US); Bruce D. Betancourt, Glastonbury, CT (US); Lauren Charlotte Elliott, Simsbury, CT (US); Laura O'Connor Hanson, Manchester, CT (US); Barkley Scott Harris, Prospect, CT (US); M. Gary Letscher, Simsbury, CT (US); Diana Reihl, Bristol, CT (US); Catherine M. Sommer, West Hartford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 262 days.

This patent is subject to a terminal disclaimer.

(21) Appl. No.: 17/317,282

(22) Filed: May 11, 2021

(65) Prior Publication Data
US 2021/0264538 A1 Aug. 26, 2021

Related U.S. Application Data

(63) Continuation of application No. 16/170,556, filed on Oct. 25, 2018, now Pat. No. 11,037,249.

(51) Int. Cl.
*G06Q 40/08* (2012.01)
*G06Q 10/0635* (2023.01)
(Continued)

(52) U.S. Cl.
CPC ............ *G06Q 40/08* (2013.01); *G06F 16/93* (2019.01); *G06F 40/174* (2020.01); *G06Q 10/0635* (2013.01)

(58) Field of Classification Search
CPC ............................... G06Q 40/00; G06Q 20/40
See application file for complete search history.

(56) References Cited

U.S. PATENT DOCUMENTS

2010/0268736 A1 * 10/2010 Ruhlen ............... G06F 16/9577
709/219

* cited by examiner

*Primary Examiner* — Ojo O Oyebisi
(74) *Attorney, Agent, or Firm* — Buckley, Maschoff & Talwalkar LLC

(57) ABSTRACT

Document creation systems and methods are provided for a potential risk relationship between an enterprise and an entity. A back-end application computer server may include a data collection engine to exchange information with a remote entity device associated with the entity. A bundle creation engine may receive the information about the entity and automatically and dynamically create a potential bundle of optional risk relationship components (each associated with an electronic file representing an optional risk relationship component document). A presentation engine may present information about the potential bundle and receive an indication of a selected subset of the potential bundle of optional risk relationship components. A final document construction engine may automatically construct, based on the selected subset and associated electronic files representing component documents, an electronic file representing a risk relationship package document to be transmitted to the remote entity device.

19 Claims, 25 Drawing Sheets

(51) Int. Cl.
*G06F 16/93* (2019.01)
*G06F 40/174* (2020.01)

DOCUMENT CREATION SYSTEM

Policy Details

General Information

Producer Code: 123456 – Entity Name — 720

Predominant State: New York — 740

Class (Operation): 56001 – Restaurant – Fine Dining — 750

Coverage Part: Property & Liability — 760

ID: — 730

Eligibility Questions

☐ Eligibility Question 1
☐ Eligibility Question 2
☐ Eligibility Question 3

DOCUMENT CREATION SYSTEM

Location/Class Schedule

Location Address Information

| | |
|---|---|
| Street | 123 Main Street  820 |
| ZIP Code | 11787  830 |
| City | New York  840 |
| County/Parish | Suffolk  850 |

Class Details

| | |
|---|---|
| Class | 56001 – Restaurant – Fine Dining |
| Annual Sales | |
| Liquor Sales | |

DOCUMENT CREATION SYSTEM

Policy Coverage – Policy Limits 1110

Property Deductible $1,000.00 ▽

Business Liability Limit $2,000,000.00 ▽  ⎤
                                           ⎬ 1120
Umbrella  $2,000,000.00 ▽                  ⎦

Broadening Endorsement

☐ None  ☐ Type One  ☐ Type Two  — 1130

Liability Coverages ( Add for $50 )   ⎤
                  ⎬ 1140
( Add for $100 )  ⎦

☐ Liability Coverage A
☐ Liability Coverage B
☐ Liability Coverage C

• • •

Estimated Premium
$2,000.00  ( Re-Rate )
— 1150

| QUOTE ID 2102 | ENTITY ID 2104 | TYPE 2106 | SELECTED COVERAGES 2108 | STATUS 2110 |
|---|---|---|---|---|
| Q_10001 | E_10001 | PROPERTY | C1, C5, C6 | IN PROCESS |
| Q_10002 | E_12345 | LIABILITY | TIER 1 DEFAULT | ISSUED |
| Q_10003 | E_54321 | PROPERTY & LIABILITY | C1, C2, C3 | IN PROCESS |
| Q_10004 | E_11111 | PROPERTY | C2 | HALTED |

FIG. 21

DOCUMENT CREATION SYSTEM AND METHOD UTILIZING OPTIONAL COMPONENT DOCUMENTS

CROSS-REFERENCE TO RELATED APPLICATIONS

The present application is a continuation of U.S. patent application Ser. No. 16/170,556 entitled "DOCUMENT CREATION SYSTEM AND METHOD UTILIZING OPTIONAL COMPONENT DOCUMENTS" and filed Oct. 25, 2018. The entire content of that application is incorporated herein by reference.

BACKGROUND

An enterprise may want to generate an overall document associated with various optional sections and/or sub-sections. For example, small and medium size businesses span a wide range of business types, and involve a wide range of business risks and risk characteristics, and a document may be created using optional sections to allocate those risks in various ways. Note that the different types of risks and/or risk characteristics may make it difficult to generate and analyze information to produce documents that can be clearly and consistently applied to different businesses (e.g., in different industries or geographical locations).

The construction of documents associated with business insurance policies is complex, and can be made particularly difficult by the wide range of different types and classes of businesses. Document creation and understanding is made even more complex by the different geographical, demographic and even environmental conditions that are relevant to the risk of loss (and the associated information incorporated into a document) for different businesses. For example, certain areas of the U.S. present higher loss risks due to catastrophic conditions such as hurricanes or floods, and documents may need to reflect that fact with specific definitions. As another example, certain areas present higher loss risks due to theft, and various loss limits might need to be adjusted as appropriate.

Note that various portions of a document may include overlapping information (e.g., with different definitions, exclusions, limits, etc.) which can create a lack of transparency and confusion. One result of such confusion is that an entity might unwittingly purchase unneeded coverage, which can significantly drive up the cost of insurance. Moreover, internal maintenance of document sections by an enterprise (e.g., to update definitions in view of a new technology) can be a cumbersome, time-consuming, and error-prone task.

It would be therefore be desirable to provide systems and methods to automatically create documents in a way that provides faster, more accurate results.

SUMMARY OF THE INVENTION

According to some embodiments, systems, methods, apparatus, computer program code and means are provided for a document creation system associated with a potential risk relationship between an enterprise and an entity. A back-end application computer server may include a data collection engine to exchange information with a remote entity device associated with the entity. A bundle creation engine may receive the information about the entity and automatically and dynamically create a potential bundle of optional risk relationship components (each associated with an electronic file representing an optional risk relationship component document). A presentation engine may present information about the potential bundle and receive an indication of a selected subset of the potential bundle of optional risk relationship components. A final document construction engine may automatically construct, based on the selected subset and associated electronic files representing component documents, an electronic file representing a risk relationship package document to be transmitted to the remote entity device.

Some embodiments comprise: means for exchanging, via a distributed communication network and an interactive user interface display by a data collection engine of a back-end application computer server associated with the enterprise, information with a remote entity device associated with the entity; based on the exchanged information, means for storing information about the entity in an entity data store; means for receiving, by a bundle creation engine of the back-end application computer server, the information about the entity; means for automatically and dynamically creating a potential bundle of optional risk relationship components, each optional risk relationship component being associated with an electronic file representing an optional risk relationship component document; means for presenting, via the remote entity device by a presentation engine of the back-end application computer server, information about the potential bundle of optional risk relationship components; means for receiving, from the remote entity device, an indication of a selected subset of the potential bundle of optional risk relationship components; based on the selected subset of the potential bundle of optional risk relationship components and associated electronic files representing component documents, means for automatically constructing, by a final document construction engine of the back-end application server, an electronic file representing a risk relationship package document; and means for transmitting an indication of the electronic file representing a risk relationship package document to the remote entity device In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to create documents in a way that provides faster, more accurate results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 7 illustrates a general information display in accordance with some embodiments.

FIG. 8 illustrates a location/class schedule display according to some embodiments.

FIG. 11 is a policy coverage display in accordance with some embodiments.

FIG. 21 is a portion of a tabular potential risk relationship database according to some embodiments.

DETAILED DESCRIPTION

The present invention provides significant technical improvements to facilitate electronic document creation and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic document creation and/or analysis by providing benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via a back-end-end application server to accurately improve the creations of documents, thus improving the overall efficiency of the system associated with message storage requirements and/or bandwidth considerations (e.g., by reducing the number of messages that need to be transmitted via a network). Moreover, embodiments associated with collecting accurate information might further improve risk values, predictions of risk values, allocations of resources, electronic record processing decisions, etc.

Figure 1:
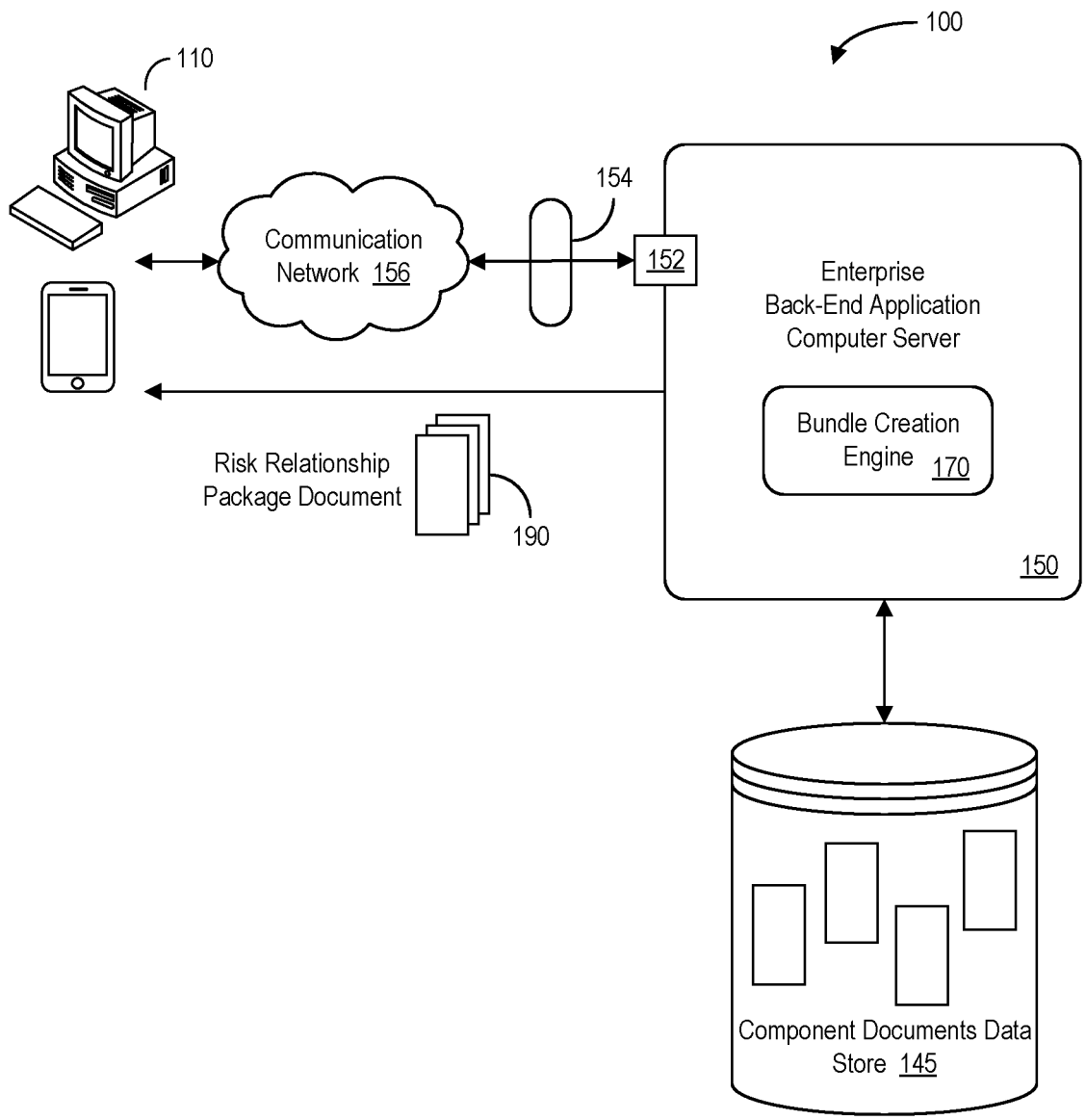
FIG. 1 is a high-level block diagram of a system in accordance with some embodiments.

FIG. 1 is a high-level block diagram of a system 100 according to some embodiments of the present invention. In particular, the system 100 includes a back-end application computer server 150 associated with an enterprise that may access information in a component documents data store 145 (e.g., storing a set of electronic records representing specific insurance coverages, insurance limits, etc.). The back-end application computer server 150 may also retrieve information from other data stores or sources in connection with a bundle creation engine 170 to supplement this information (e.g., from social network platforms, credit agencies, governmental sources, etc.). The back-end application computer server 150 may also exchange information with a remote entity device 110 (e.g., via a communication port 152 and/or firewall 154). According to some embodiments, an interactive graphical user interface platform of the back-end application computer server 150 (and, in some cases, third-party data) may facilitate document creation, decisions, predictions, and/or the display of document options via one or more remote administrator computers (e.g., to gather additional information about an entity) and/or the remote entity device 110. For example, the remote entity device 110 may transmit component selections to the back-end application computer server 150. Based on the component selections, the back-end application computer server 150 may select particular documents components from the component documents data store 145 and automatically create a final risk relationship package document 190. Note that the back-end application computer server 150 and/or any of the other devices and methods described herein might be associated with a third party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate creation of documents via electronic records in the component documents data store 145. As used herein, the term "automated" may refer to, for example, actions that can be performed with little (or no) intervention by a human.

As used herein, devices, including those associated with the back-end application computer server 150 and any other device described herein may exchange information via any communication network 156 which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the component documents data store 145. The component documents data store 145 might, for example, store electronic records representing document components that define insurance coverage options. The component documents data store 145 may also contain information about how these different options interact with each other and with information about an entity being insured. The component documents data store 145 may be locally stored or reside remote from the back-end application computer server 150. As will be described further below, the component documents data store 145 may be used by the back-end application computer server 150 in connection with an interactive user interface to create the final risk relationship package document 190. Although a single back-end application computer server 150 is shown in FIG. 1, any number of such devices may be included. Moreover, various devices described herein might be combined according to embodiments of the present invention. For example, in some embodiments, the back-end application computer server 150 and a presentation engine might be co-located and/or may comprise a single apparatus.

Figure 2:
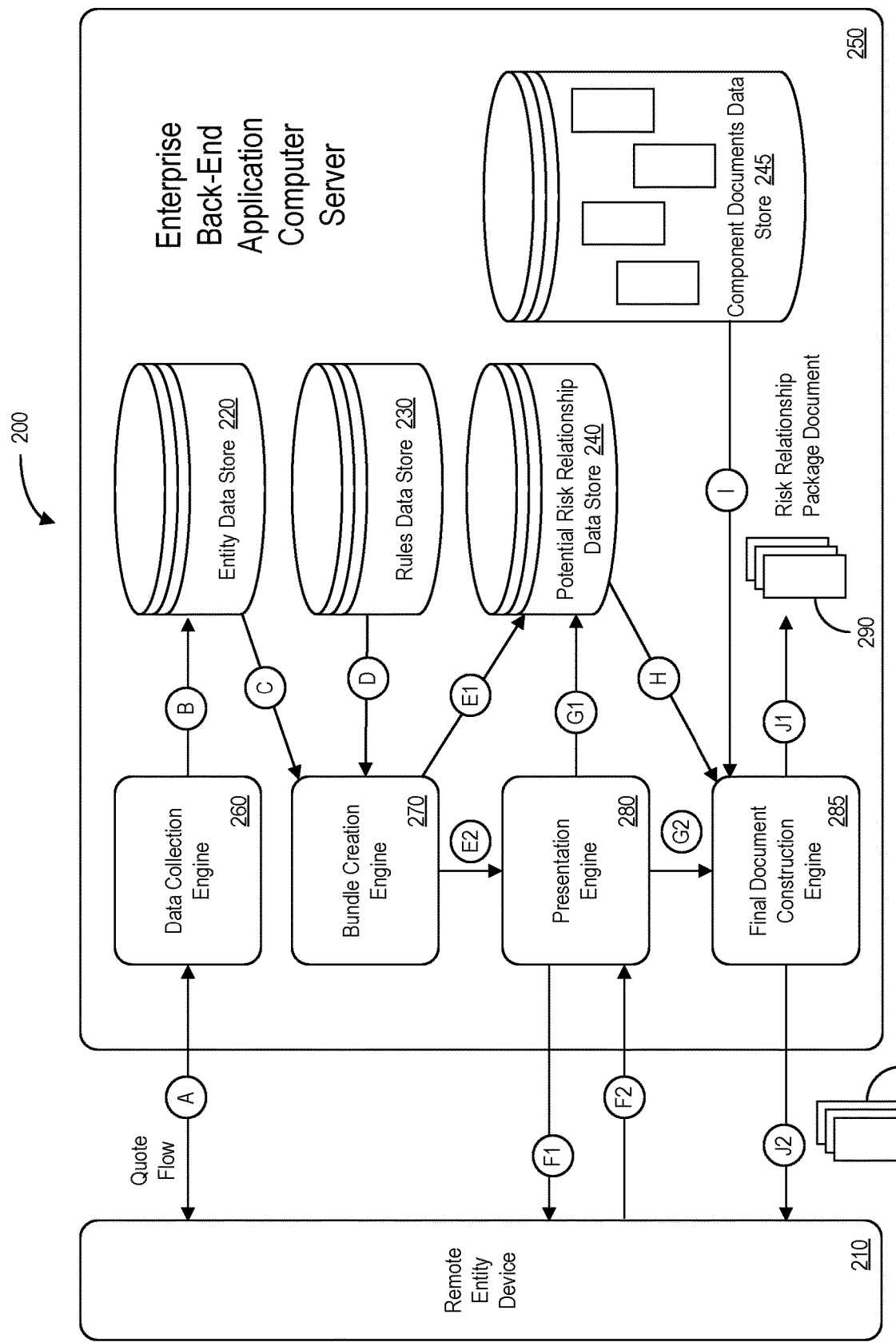
FIG. 2 is a more detailed architecture for a system according to some embodiments.

FIG. 2 is a more detailed architecture for a system 200 according to some embodiments. As before, the system includes a back-end application computer server 250 that exchanges information with a remote entity device 210. In particular, at (A) the back-end application computer server 250 may exchange information with a remote entity device 210. For example, a computer server associated with an insurance enterprise might collect information about an entity via a web browser interface during a quote flow (e.g., entity name, location, industry, etc.). This information may be stored into an entity data store 220 at (B). According to some embodiments, third-party data (e.g., from social media, credit services, news sources, or governmental databases) may be used to supplement the information in the entity data store 220.

At (C), a bundle creation engine 270 may access the information in the entity data store 220 and apply one or more rules from a rules data store 230 at (D). The result of application of the rules may be stored into a potential risk relationship data store 240 at (E1) and/or provided to a presentation engine 280 at (E2). The presentation engine 280 may transmit a set of coverage options to the remote user device 210 at (F1) and receive selections from the entity at (F2). The selections may be used to update the information in the potential risk relationship data store 240 at (G1) and/or be provided to a final document construction engine 285 at (G2).

The final document construction engine 285 may use selected coverages (e.g., received from the presentation engine 280 at (G2) or retrieved from the potential risk relationship data store 240 at (H)) along with records from a component documents data store 245 at (I) to create aa final risk relationship package document 290. The final risk relationship package document 290 may be, for example, output internally at (J1) (e.g., to an underwriter or administrator) and/or transmitted to the remote entity device 210 at (J2).

Figure 3:
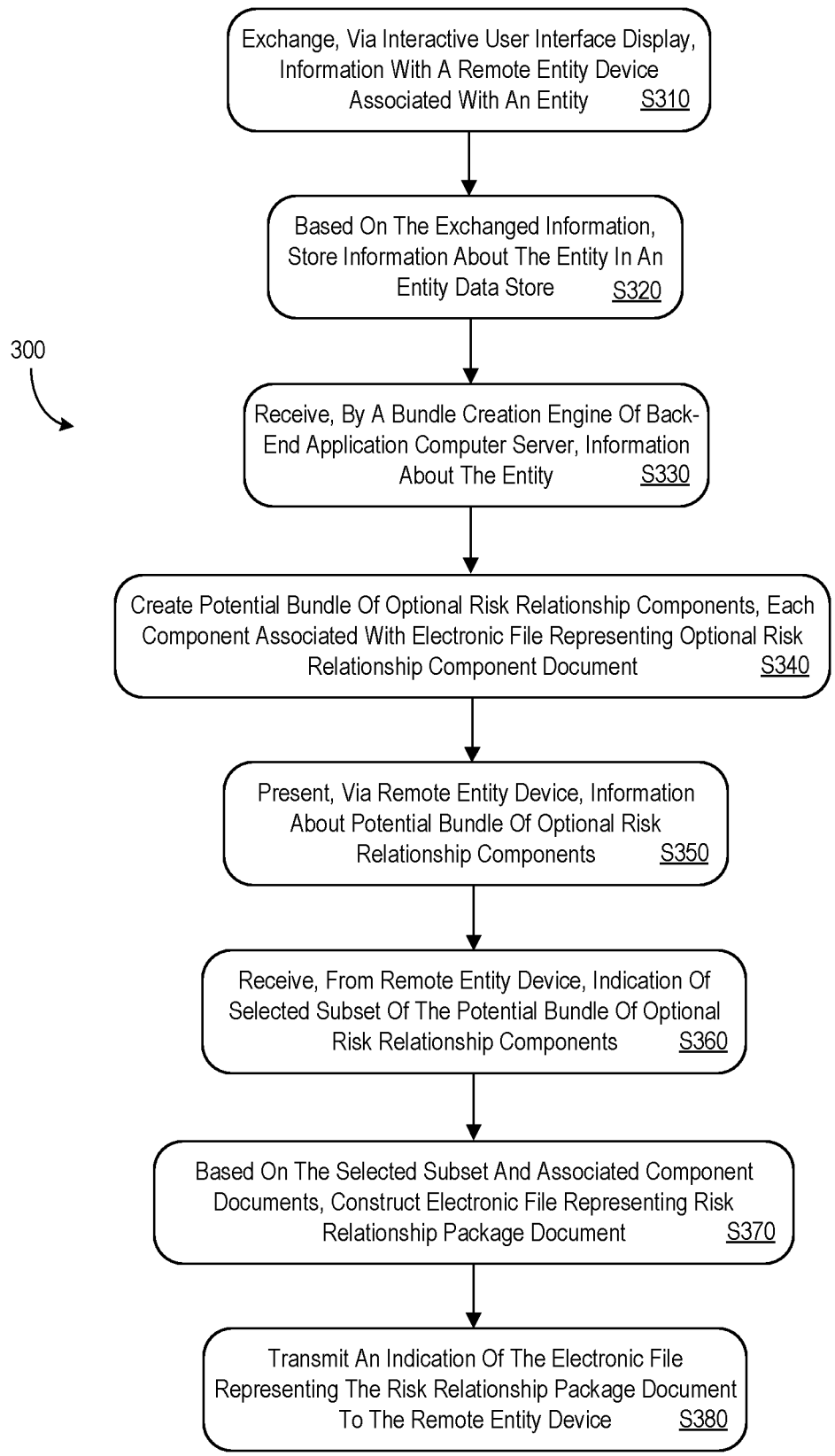
FIG. 3 illustrates a method according to some embodiments of the present invention.

Note that the systems 100, 200 of FIGS. and 2 are provided only as examples, and embodiments may be associated with additional elements or components. FIG. 3 illustrates a method 300 that might be performed by some or all of the elements of the systems 100, 200 described with respect to FIGS. 1 and 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a data collection engine of a back-end application computer server associated with an enterprise may exchange information with a remote entity device associated with an entity (e.g., a small or mid-size business interested in purchasing insurance). Based on the exchanged information, at S320 the system may store information about the entity in an entity data store. According to some embodiments, information from the entity data store is supplemented with third-party data. For example, the information might be supplemented with governmental data (e.g., from a department of motor vehicles), payroll data (e.g., employee salary data), credit score data, social media data, web analytics (e.g., to determine an industry associated with the entity), etc.

At S330, a bundle creation engine of the back-end application computer server may receive the information about the entity. At S340, the system may automatically and dynamically create a potential bundle of optional risk relationship components. For example, each optional risk relationship component might be associated with an electronic file representing an optional risk relationship component document. According to some embodiments, the bundle creation engine further determines that at least some optional risk relationship components are not eligible to be selected (e.g., there are not enough employees to qualify for the coverage). According to some embodiments, the bundle creation engine further indicates at least some optional risk relationship components are suggested to be selected (e.g., a package of suggested or recommended coverages might be displayed to the entity). According to some embodiments, the bundle creation engine creates a plurality of potential bundles, each representing a different tier of risk relationship protection (e.g., "good," "better," and "best" tiers of insurance coverages).

At S350, a presentation engine of the back-end application computer server may present information about the potential bundle of optional risk relationship components via the remote entity device. At S360, the system may receive, from the remote entity device, an indication of a selected subset of the potential bundle of optional risk relationship components. Based on the selected subset of the potential bundle of optional risk relationship components and associated electronic files representing component documents, a final document construction engine of the back-end application server may create an electronic file that represents a risk relationship package document at S370. At S380, the system may transmit an indication of the electronic file representing the risk relationship package document to the remote entity device.

According to some embodiments, each optional risk relationship component is further associated with a resource value and a total resource value is dynamically updated and presented via the interactive user interface display based on the selected subset of the potential bundle of optional risk relationship components. For example, the resource value might be an insurance premium associated with that coverage. According to some embodiments, the resource value of at least one optional risk relationship component is based at least in part on selection of another optional risk relationship component (e.g., selection of one insurance coverage might decrease the cost of a related insurance coverage).

According to some embodiments, the potential risk relationship is associated with a potential insurance policy, the enterprise is associated with an insurance enterprise, the entity is associated with a potential insured, and each optional risk relationship component is associated with an insurance coverage component. For example, the information about the entity in the entity data store might include an insurance policy identifier, a business name, a geographic location (e.g., a state of incorporation or ZIP code), an insurance policy type, an industry class, an employee count, annual sales data, business personal property data, etc. According to some embodiment, at least one insurance coverage component is associated with business insurance, property insurance, liability insurance, cybersecurity insurance, weather damage insurance, employer insurance, tenant insurance, building owner insurance, and/or international insurance. Moreover, according to some embodiments the presentation engine further determines, for at least one insurance coverage component: a deductible amount, a coverage amount, an insurance premium, and/or a range of potential insurance premiums.

Figure 4:
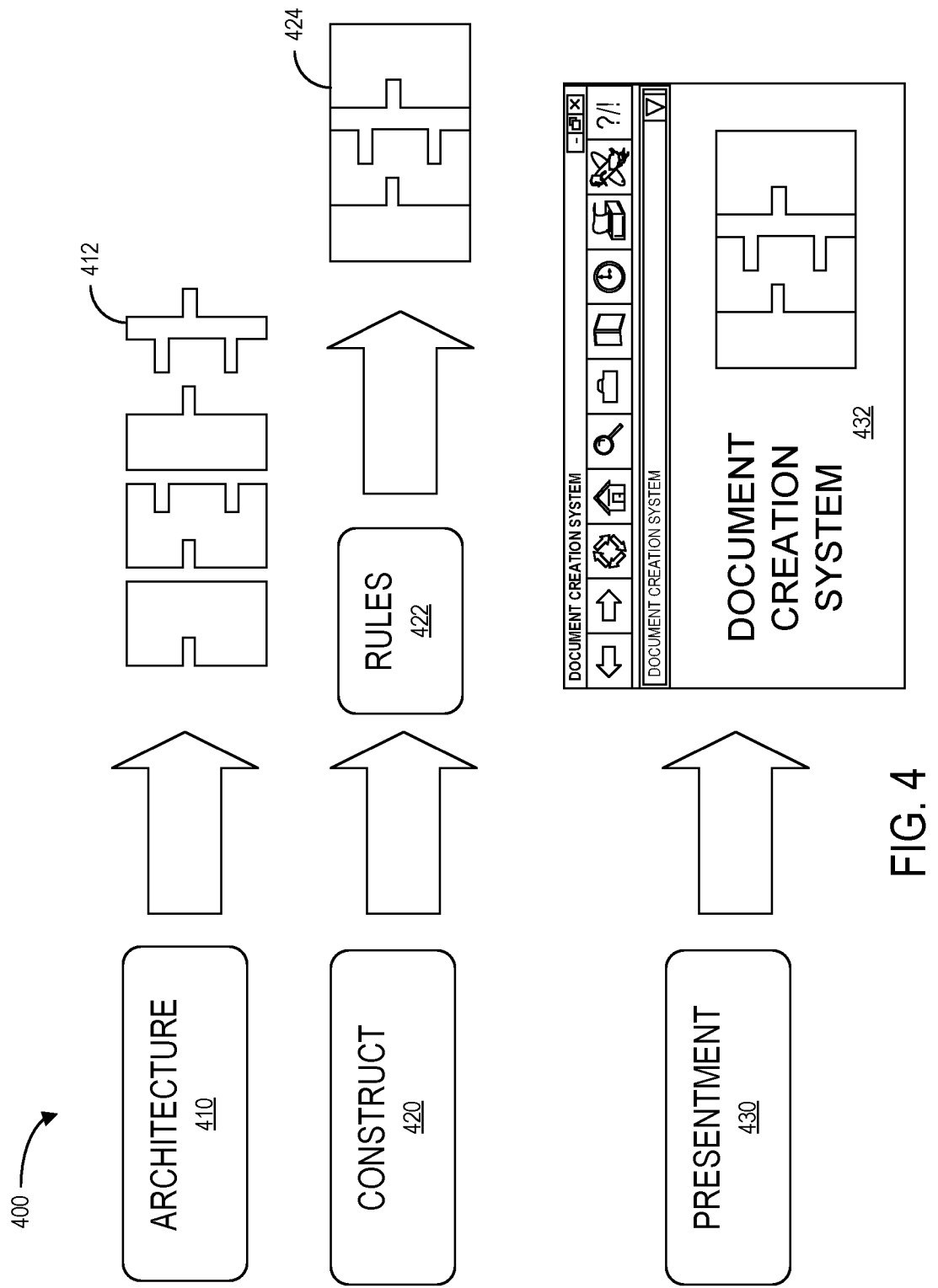
FIG. 4 is a class plan overview of a document creation system in accordance with some embodiments.

FIG. 4 is a class plan overview 400 of a document creation system in accordance with some embodiments. An architecture component 410 may be associated with individual forms 412 (e.g., components or optional insurance coverages) that can be used to create a final insurance policy document. For example, in the case of a property insurance policy, forms may be broken apart into modular pieces such that a single form represents a single coverage. Such an approach may allow for a wide range of limits and terms (e.g., waiting periods) being filed with an appropriate state regulatory authority to allow for substantial customization and increased underwriting flexibility.

A construct component 420 may include rules 422 defining how the individual components 412 can fit together 424 to form a complete insurance policy. For example, in the case of a property insurance policy, a core or base form might be supplemented with twenty additional building and business personal property coverages and coverage extensions, a home-based business package (including ten additional coverages and coverage extensions, a broadening endorsement bundle of additional coverages and coverage extensions, increased limits, etc. Such a modular architecture may let an enterprise create wide range of customized bundles and policies.

Figure 5:
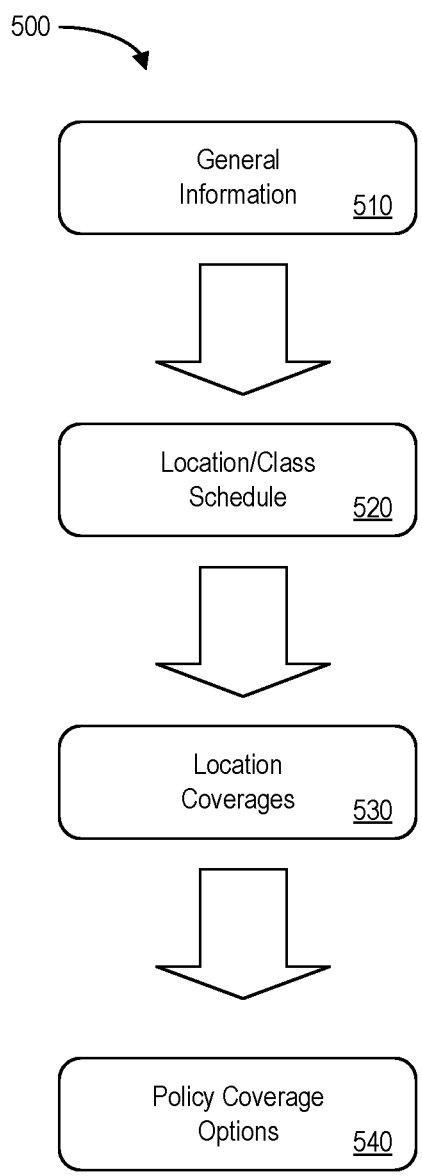
FIG. 5 is a presentation information flow according to some embodiments.

A presentment component 430 may control how the optional coverages and/or final policy is displayed on a remote entity device screen 432 (e.g., via a web browser). For example, FIG. 5 is a presentation information flow 500 according to some embodiments. A general information page 510 may be used to collect an industry class, employee count, etc. A location/class schedule page 520 may be used to collect annual sales data, area information, class details, etc. A location coverages page 530 may be used to collect building information, Business Personal Property ("BPP") limits, etc. A policy coverage options page 540 may be used to collect coverages that are displayed separately by Line Of Business ("LOB"), optional coverages in a list format, etc.

Figure 6:
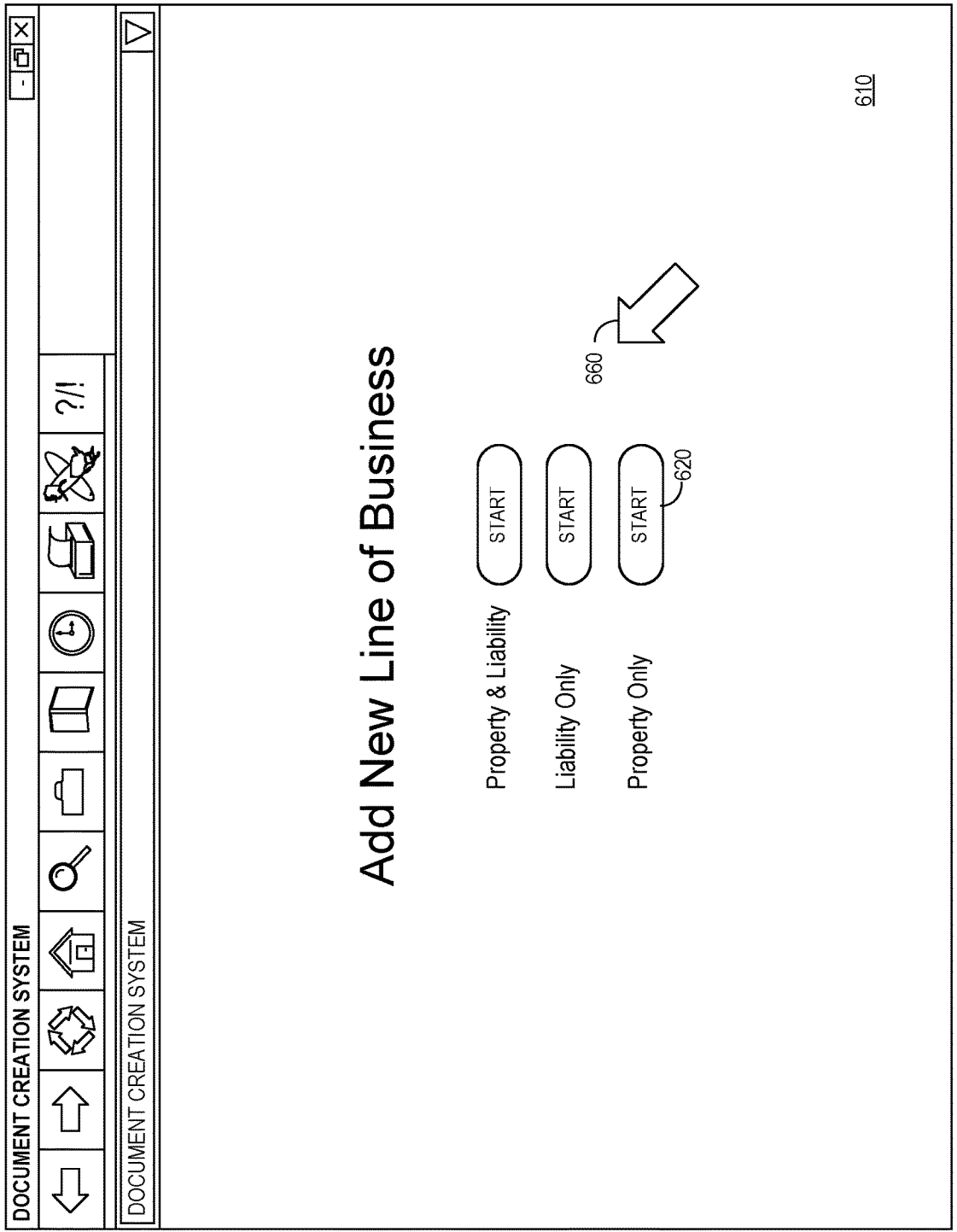
FIG. 6 illustrates a policy type display according to some embodiments.

According to some embodiments, a recommendation engine may provide customized coverage recommendations based on information collected in an insurance quote. For example, FIG. 6 illustrates a policy type display 600 that includes a data entry area 610 might be used by an entity (e.g., a small business) to initiate a property and liability insurance process, a liability only insurance process, or a property only insurance process (e.g., via start icons 620 selected via touchscreen or computer mouse pointer 660). FIG. 7 illustrates a general information display 700 that includes a data entry area 710 that might be used to enter a produce code 720 (e.g., an entity name and/or identifier 730), a predominant state 740, a class 750, a coverage party 760, etc. along with eligibility questions 770. The display 700 might be used to collect general information, such as a business class (e.g., to determine which industry bundles will be displayed, eligibility for certain coverages within risk-based bundles, default limits for certain coverages, etc.). As another example, an employee count might be used to determines whether a quote is eligible for recommended employer coverages, default limits for Employment Practices Liability Insurance ("EPLI"), etc. FIG. 8 illustrates a location/class schedule display 800 that includes a data entry area 810 that might be used to enter location address information (e.g., street address 820, ZIP code 830, city 840, county or parish 850, etc.) along with industry class details 860. Examples of information that might be collected on the display 800 include annual sales (e.g., to determine default limits for certain coverages), class details (e.g., to refine recommended industry coverages, such as for liquor sales), Auto-Owners Insurance ("AOI") and/or building/BPP limits (e.g., to determine default limits for certain coverages), etc.

Figure 9:
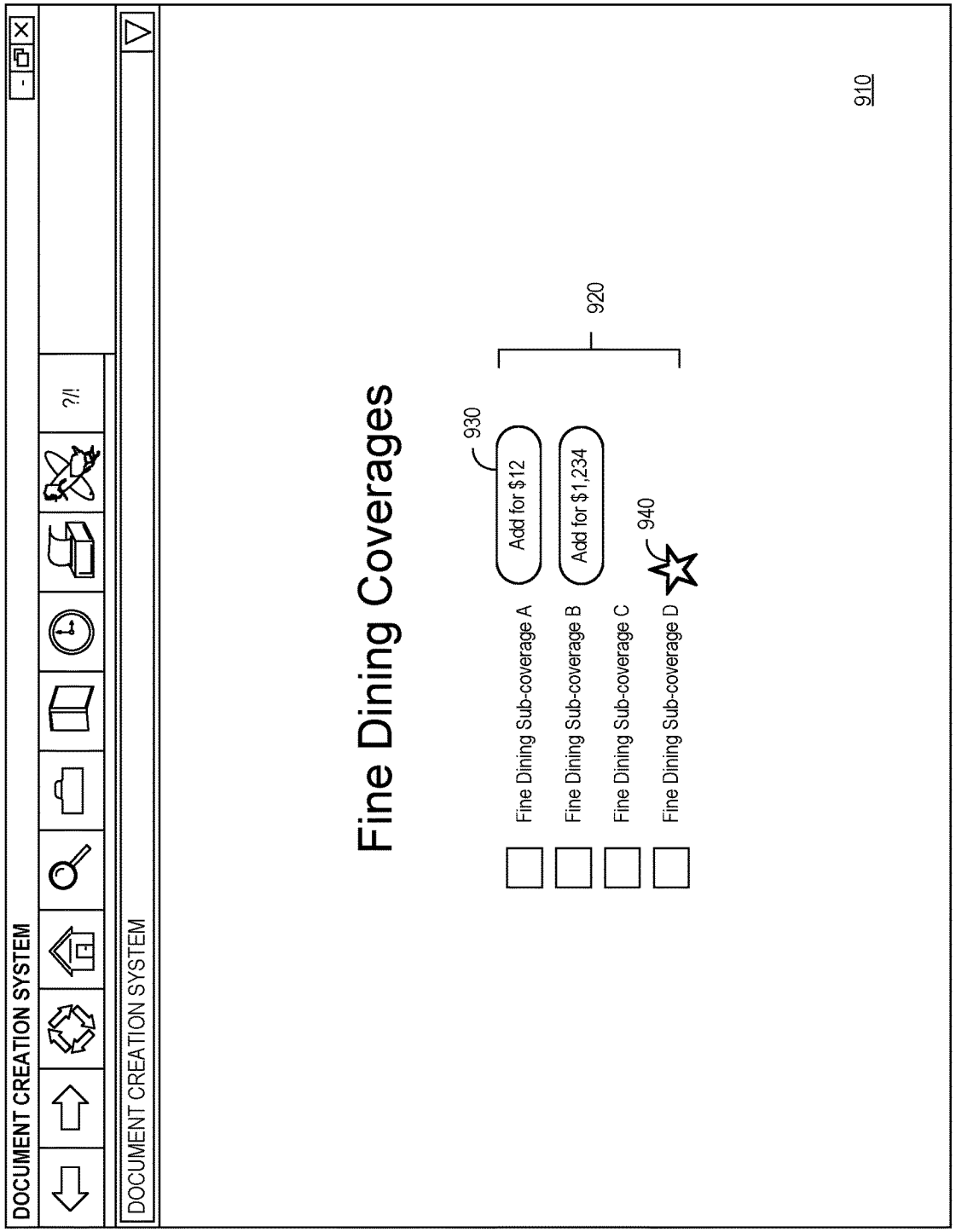
FIG. 9 illustrates a coverage bundle display in accordance with some embodiments.

Note that bundles of optional coverages may allow a more intuitive "on the glass" presentment to drive ease of doing business for agents and/or an increase in penetration rates for some coverages. According to some embodiments, a risk-based bundle may be provided such that coverages align with exposure (and may be applicable to all industries). In some cases, a majority of optional coverages may be aligned to risk, not industry. In other cases, an industry-based bundle may be provided for coverages meant for a particular industry or class. For example, a bundle might be based on predominant class code (an in some embodiments, only a single industry bundle might be provided for any given quote). FIG. 9 illustrates a coverage bundle display 900 including a fine dining coverage data entry area 910 where an entity might select one or more particular sub-coverage options 920. According to some embodiments, an estimated resource value (insurance premium) is provided 930 for some selections. Note that coverages in a bundle might be associated with property or liability insurance and the entity might be able select as many (or as few) coverages as desired. Note that eligibility of a coverage may drive whether it will appear in a bundle for a particular quote. For example, a fine dining bundle might be provided when the predominate market group is "restaurant and food services" and the value is annual liquor sales is more than zero dollars. According to some embodiments, a "recommended" or "suggested" icon 940 may be displayed proximate to certain sub-coverage options 920 (e.g., these may have been automatically selected by the insurance enterprise as being potentially appropriate based on business information previously received from the user).

Figure 10:
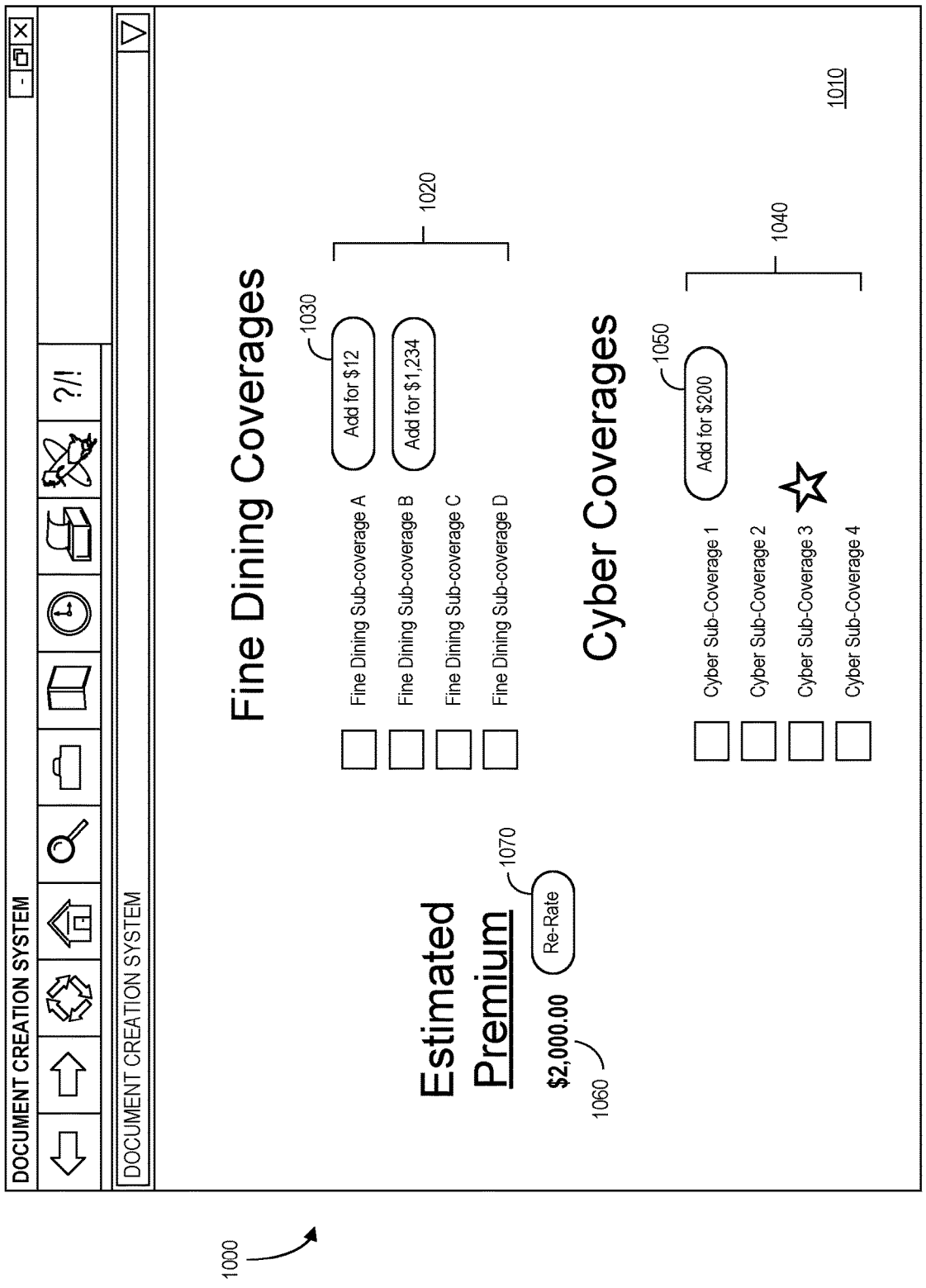
FIG. 10 illustrates a display with multiple coverage bundles according to some embodiments.

FIG. 10 illustrates a display 1000 with multiple coverage bundles according to some embodiments. In particular, the display 1000 includes a data entry area 1010 for a fine dining coverage bundle 1020 (including some estimated premium values 1030) and a cyber coverage bundle 1040 (including some estimated premium values 1050). In this case, an overall total estimate premium value 1060 is automatically calculated and displayed (and the entity might request that the value be re-rated 1070 when changes are made). With respect to bundle eligibility, note that the eligibility of each bundle may be determined by an underwriting group with input from a product: group. For example, a cyber bundle might be shown for all policies, an employer bundle might be shown when the number of employees is more than zero, a tenant bundle might be shown when BPP is more than zero, a technology bundle might be shown when based on the market group, a veterinarian bundle might be shown based on the industry class, etc. With respect to coverage recommendations, note that coverages in each bundle might be selected by a product team using, for example, a product manual, class guide, general product knowledge, current penetration rates, etc.

According to some embodiments, recommended coverages display an estimated premium on the glass and may represent coverages that might be appropriate for a Small Business Owner ("SBO") because it is generic need for all classes/market groups (i.e., data breach), a specific class/market group need (e.g., food contamination), etc. In some cases, prior information obtained in a quote may drive one or more recommendations (e.g., liquor liability may appear when liquor sales are more than zero dollars). The displayed coverages (as opposed to "recommended" coverages may represent coverages that a SBO may or may not need (and might not display an estimated premium on the glass—instead the entity might select "Re-Rate" 1070 to update the estimated premium).

FIG. 11 is a policy coverage display 1100 in accordance with some embodiments. The display 1100 includes a data entry area 1110 when an entity can provide policy limits 1120 (e.g., a property deductible or business liability limit), broadening endorsement data 1130, liability coverages 1140, a total estimated premium value 1150, etc. The display 1100 might be provided for Business Owners Policy ("BOP") insurance (either property or General Liability ("GL")). For example, when the business class is "fine dining," a fine dining bundle might be displayed and defaulted limits for recommended coverages might be determined. When the number of employees is greater than one, an employee bundle might be displayed and default limits for EPLI might be determined. Similarly, annual sales of $400,000 might result in default limits for recommended coverages.

Figure 12:
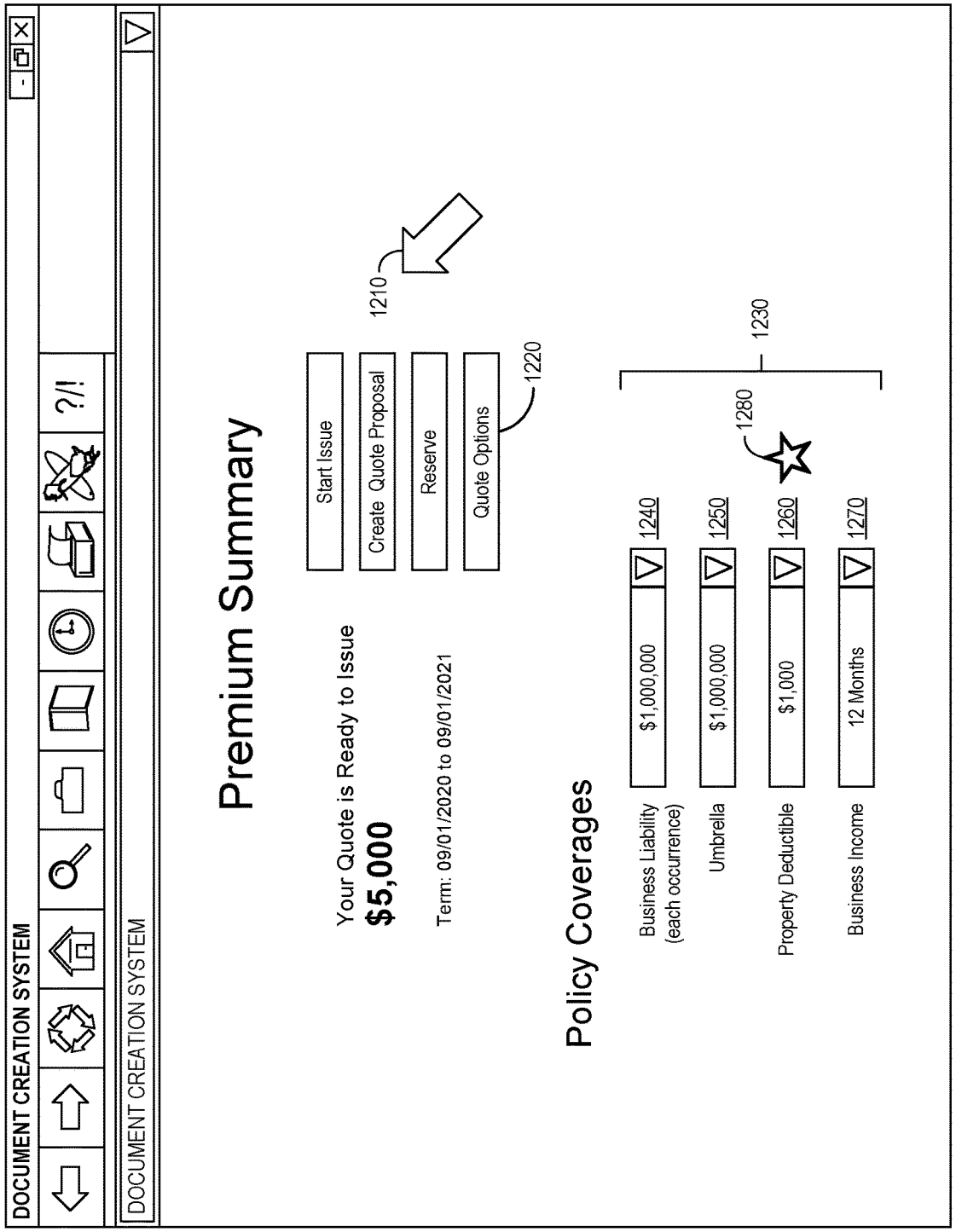
FIG. 12 is a premium summary display in accordance with some embodiments.

FIG. 12 is a premium summary display 1200 in accordance with some embodiments. The display 1200 may be provided when the user has selected all of his or her options and the quote is ready to issue. According to some embodiments, a touchscreen or computer pointer 1210 may be used to select several options 1220 to move forward (e.g., start the issue process, create a quote proposal, etc.). The user may also adjust various policy coverages 1230 via the display, such as a business liability amount 1240, an umbrella coverage amount 1250, a property deductible amount 1260, business income duration 1270, etc. According to some embodiments, the display also includes the recommendations or suggestions of the enterprise (e.g., to remind a user that a particular coverage type or amount might be appropriate based on business information, rules, and logic).

Figure 13:
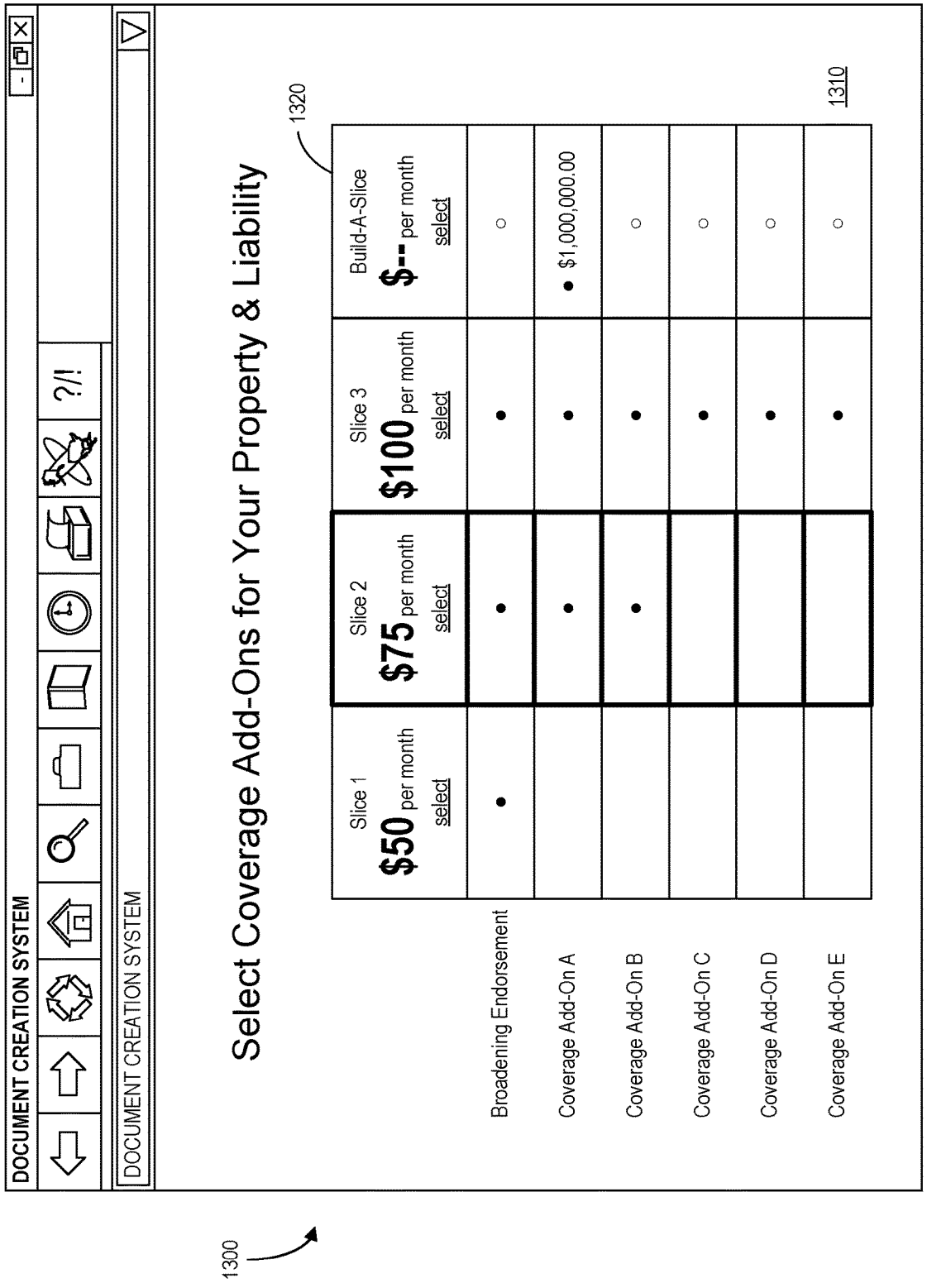
FIG. 13 illustrates entity-selectable tiers or slices according to some embodiments.

FIG. 13 illustrates a coverage add-on display 1300. The display 1300 includes a data entry area 1310 that provides entity-selectable tiers or slices 1320 according to some embodiments (e.g., selectable a small business owner or insurance agent). Some embodiments may use individual coverages instead of full bundles (e.g., to create a cleaner presentment). According to some embodiments, coverages may be priced with a "good" limit (as determined by underwriters). Direct sales team will be able to upsell into higher limits if appropriate. In the example of FIG. 13, slice 1 includes a broadening endorsement option while slice 2 adds coverages which are likely be to be important (e.g., based on a generic need for all classes/market groups (i.e., data breach) and/or specific class/market group needs (e.g., coverage add-on A). Slice 3 includes all slice 2 coverage add-ons plus other options that may be needed but aren't critical.

Figure 14:
FIG. 14 is a spreadsheet-based rules implementation in accordance with some embodiments.

The determination of eligibility and/or presentment priority may be implemented via a rules-based approach. For example, FIG. 14 is a spreadsheet-based rules implementation 1400 in accordance with some embodiments. In this case, different coverage types (e.g., "Coverage A," Coverage B," etc.) may be indicated as recommended (or not recommended) along with a display priority. The implementation 1400 may further include default limits and an indication of which slices will include each coverage type.

Figure 15:
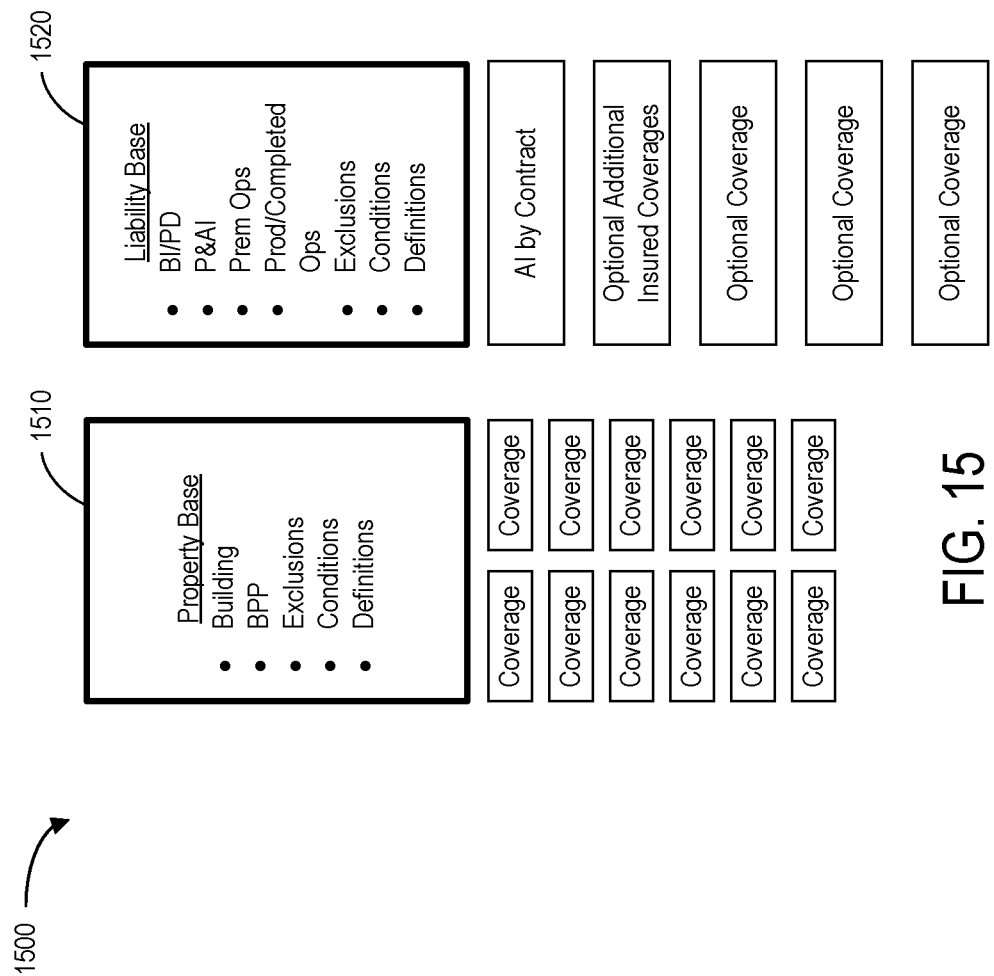
FIG. 15 illustrates modular architecture according to some embodiments.

FIG. 15 illustrates modular architecture 1500 according to some embodiments. For a property base form 1510, building, BPP, exclusions, conditions, definitions may be provided. All additional coverages and coverage extensions may be implemented with individual forms. According to some embodiments, coverages unique to a broadening endorsement may also become individual forms. Note that modularization may help eliminate the unintentional stacking of limits. For example, when several coverages exist in multiple places (e.g., base, broadening endorsement, and optional endorsement) coverage overlap may result. With a modular architecture, coverages will be combined into a single endorsement with the ability to vary limits (instead of providing multiple limit grants) to reduce coverage overlap and limit stacking.

Note that liability products may be highly standardized in the BOP market. A liability base form 1520, according to some embodiment, may therefore define core coverages (such as Bodily Injury ("BI"), Property Damage ("PD"), and Personal and Advertising Injury ("P&AI")). Additional Insured ("AI") by contract and AI may be removed from the base form 1520 and made into a separate, optional endorsement.

Some embodiments may give an underwriting team the flexibility to bundle coverages based on appetite and what exposures an enterprise is willing to insure. For example, an enterprise may be willing to write liability and some property coverages but not be completely comfortable with all of the property exposures that are built in to a current base form or broadening endorsements. As the appetite of an enterprise expands, it may be able offer more coverage and limits that are appropriate for the scope and size of individual customers.

Figure 16:
FIG. 16 illustrates broadening endorsements with various levels of coverage in accordance with some embodiments.
Figure 17:
FIG. 17 is a broadening endorsement comparison according to some embodiments.

According to some embodiments, multiple levels of coverage may be provided with intuitive step-ups between levels (along with consistent coverages and limit increase) instead of using an industry-based approach. For example, FIG. 16 illustrates broadening endorsements 1600 with various levels of coverage in accordance with some embodiments. Note that blanket limits may be used in all levels. As a result, comparing broadening endorsements may be simplified. FIG. 17 is a broadening endorsement comparison 1700 according to some embodiments including a base policy along with levels A, B, and C. According to some embodiments, all coverages exist in each version of a broadening endorsement. Moreover, limits for each coverage may always increase (and always replace limits in the base). Similarly, when higher limits are purchased the will always replace limits in the base endorsement.

Figure 18:
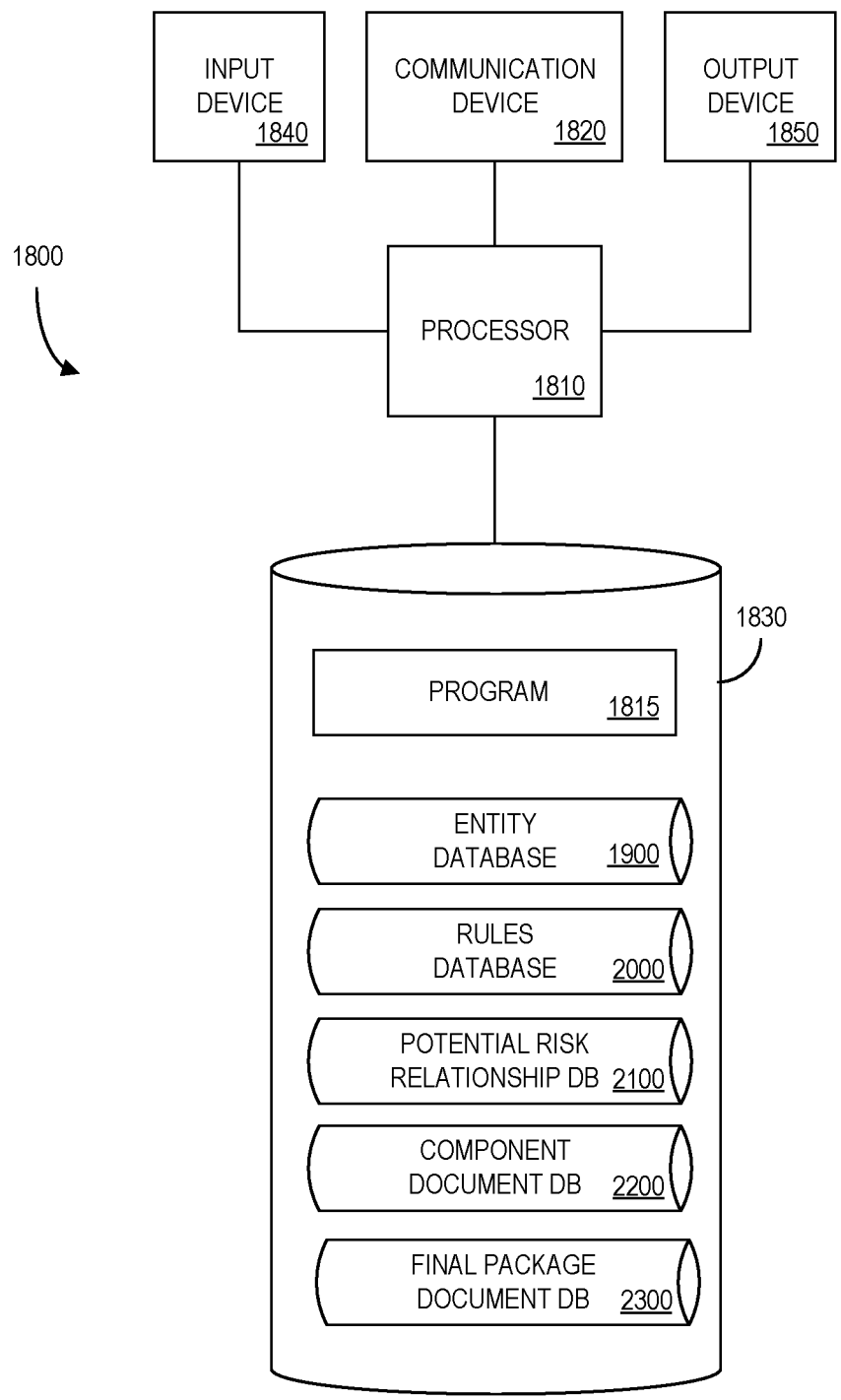
FIG. 18 is a block diagram of an apparatus in accordance with some embodiments of the present invention.

The embodiments described herein may be implemented using any number of different hardware configurations. For example, FIG. 18 illustrates an apparatus 1800 that may be, for example, associated with the systems 100, 200 described with respect to FIGS. 1 and 2, respectively. The apparatus 1800 comprises a processor 1810, such as one or more commercially available Central Processing Units ("CPUs") in the form of one-chip microprocessors, coupled to a communication device 1820 configured to communicate via a communication network (not shown in FIG. 18). The communication device 1820 may be used to communicate, for example, with one or more remote administrator computers and or communication devices (e.g., PCs and smartphones). Note that communications exchanged via the communication device 1820 may utilize security features, such as those between a public internet user and an internal network of the insurance enterprise. The security features might be associated with, for example, web servers, firewalls, and/or PCI infrastructure. The apparatus 1800 further includes an input device 1840 (e.g., a mouse and/or keyboard to enter information about pre-determined logic rules to automatically and dynamically adjust a presentation of information to an entity, etc.) and an output device 1850 (e.g., to output reports regarding insurance quote results).

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1815 and/or a risk evaluation tool or application for controlling the processor 1810. The processor 1810 performs instructions of the program 1815, and thereby operates in accordance with any of the embodiments described herein. For example, the processor 1810 may exchange, via a distributed communication network, information with a remote entity device. Based on the exchanged information, the processor may store information about the entity in an entity database 1900. The processor 1810 may also automatically and dynamically create a potential bundle of optional risk relationship components and present information about the potential bundle. The processor 1810 may also receive an indication of a selected subset of the potential bundle of optional risk relationship components and, based on the selected subset and associated electronic files representing component documents, automatically construct an electronic file representing a risk relationship package document.

The program 1815 may be stored in a compressed, uncompiled and/or encrypted format. The program 1815 may furthermore include other program elements, such as an operating system, a database management system, and/or device drivers used by the processor 1810 to interface with peripheral devices.

As used herein, information may be "received" by or "transmitted" to, for example: (i) the back-end application computer server 1800 from another device; or (ii) a software application or module within the back-end application computer server 1800 from another software application, module, or any other source.

In some embodiments (such as shown in FIG. 18), the storage device 1830 further stores the entity database 1900, a rules database 2000, a potential risk relationship database 2100, a component documents database 2200, and a final package document database 2300. Examples of databases that might be used in connection with the apparatus 1800 will now be described in detail with respect to FIGS. 19 through 23. Note that the database described herein is only an example, and additional and/or different information may be stored therein. Moreover, various databases might be split or combined in accordance with any of the embodiments described herein. For example, the entity database 1900 and potential risk relationship database 2100 might be combined and/or linked to each other within the program 1815.

Figure 19:
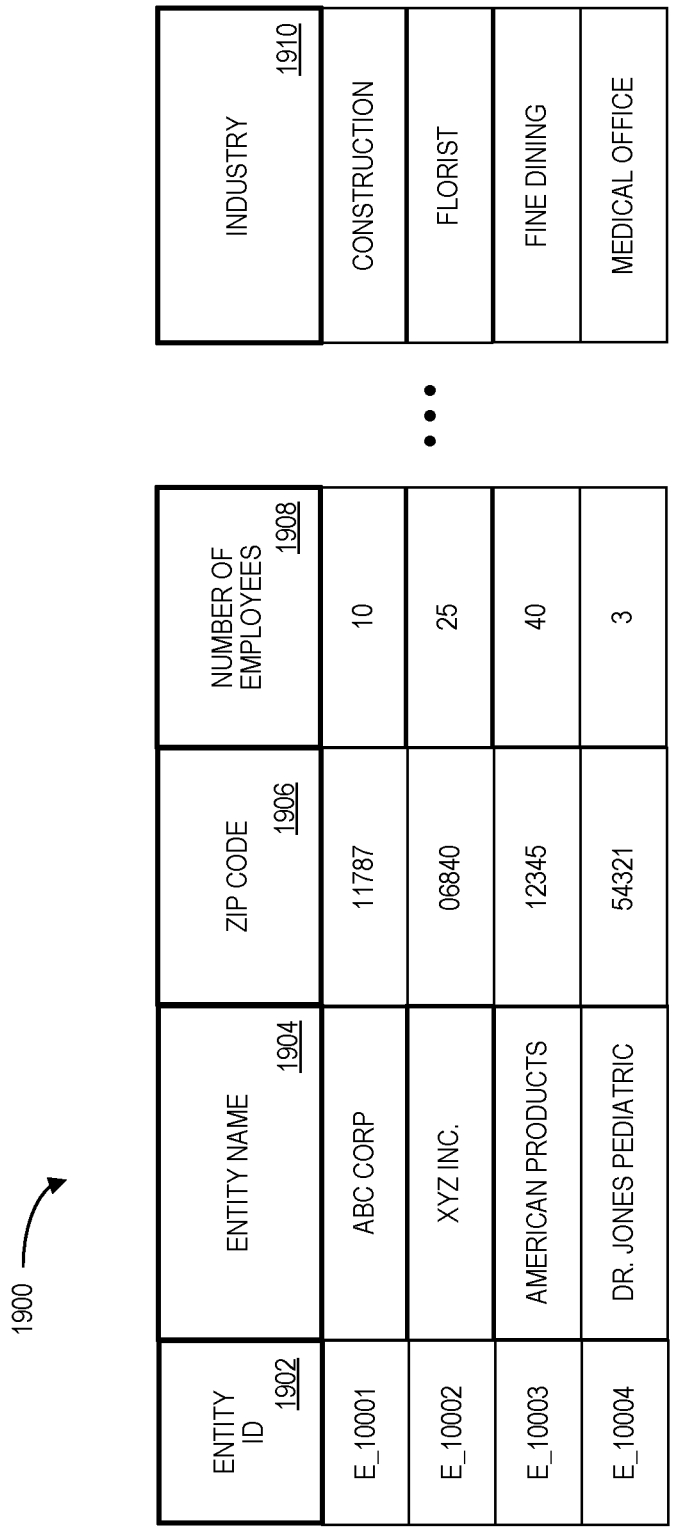
FIG. 19 is a portion of a tabular entity database according to some embodiments.

Referring to FIG. 19, a table is shown that represents the entity database 1900 that may be stored at the apparatus 1900 according to some embodiments. The table may include, for example, entries associated with potential SBO insurance customers. The table may also define fields 1902, 1904, 1906, 1908, 1910 for each of the entries. The fields 1902, 1904, 1906, 1908, 1910 may, according to some embodiments, specify: an entity identifier 1902, an entity name 1904, a ZIP code 1906, a number of employees 1908, and an industry 1910. The entity database 1900 may be created and updated, for example, based on information electrically received from a remote entity device (e.g., during a quote flow).

The entity identifier 1902 may be, for example, a unique alphanumeric code identifying a SBO interested in purchasing insurance. The entity name 1904 might identify the entity and the ZIP code 1906 may indicate where the entity is located or incorporated. The number of employees 1908 might indicate how many people work for the entity, and the industry 1910 might be a class code or other identifier that indicates the type of work performed by the entity (e.g., construction, fine dining, etc.).

Figure 20:
FIG. 20 is a portion of a tabular rules database according to some embodiments.

FIG. 20 is a portion of a tabular rules database 2000 according to some embodiments. The table may include, for example, entries associated with rules that may be used to create, display, and/or suggest coverage options and bundles to a potential customer. The table may also define fields 2002, 2004, 2006, 2008, 2010 for each of the entries. The fields 2002, 2004, 2006, 2008, 2010 may, according to some embodiments, specify: a rule identifier 2002, optional coverage 2004, a recommended status 2006, a display priority 2008, and rule 2010. The rules database 2000 may be created and updated, for example, based on information received from an enterprise administrator (e.g., in an underwriting group). According to some embodiments, the rules database 2000 might be implement via a spreadsheet application.

The rule identifier 2002 may be, for example, a unique alphanumeric code identifying a rule that may be used to create, display, and/or suggest coverage options and bundles to a potential customer. The optional coverage 2004 describes the component associated with the rule and the recommended status 2006 indicates whether or not the coverage 2004 will default to "recommended." The display priority 2008 may be used when determining where to position the coverage 2004 with respect to other coverages and the rule 2010 might define when the coverage 2004 is available, when the coverage will be included within a bundle of coverages, etc.

FIG. 21 is a portion of a tabular potential risk relationship database 2100 according to some embodiments. The table may include, for example, entries associated with insurance quotes being processed by an enterprise. The table may also define fields 2102, 2104, 2106, 2108, 2110 for each of the entries. The fields 2102, 2104, 2106, 2108, 2110 may, according to some embodiments, specify: a quote identifier 2102, an entity identifier 2104, a type 2106, selected coverages 2108, and a status 2110. The potential risk relationship database 2100 may be created and updated, for example, based on information electrically received from a remote entity device (e.g., during a quote flow).

The quote identifier 2102 may be, for example, a unique alphanumeric code identifying a request from a SBO seeking insurance. The entity identifier 2104 may identify the entity and may be based on or associated with the entity identifier 1902 in the entity database 1900. The type 2106 may indicate what kind of insurance is associated with the quote (e.g., property only, liability only, or property and liability). The selected coverages 2108 may comprise a series of identifiers indicating optional insurance coverages, a selected tier of protection, etc. The status 2110 might indicate that a requested quote is in process, that an insurance policy has been sold and issued, that the quote process has been halted, etc.

Figure 22:
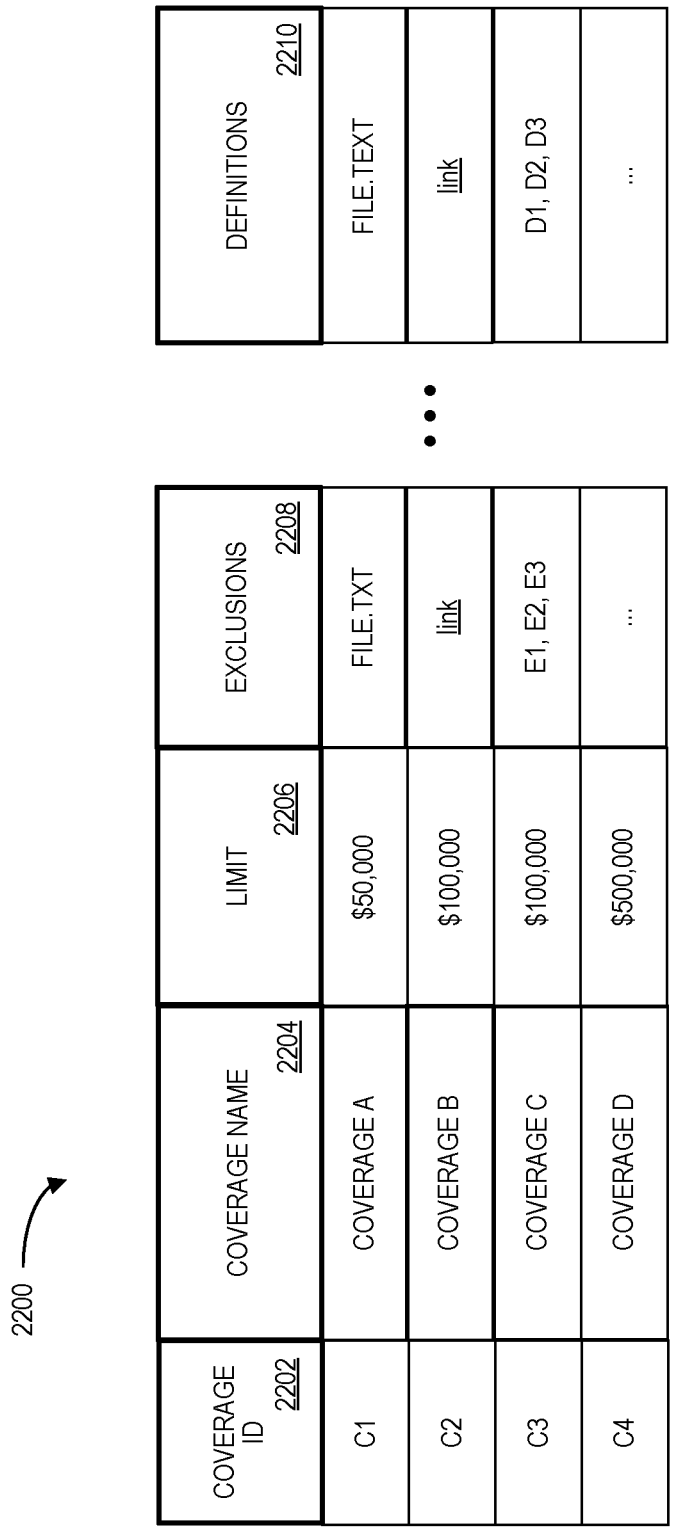
FIG. 22 is a portion of a tabular component document database according to some embodiments.

FIG. 22 is a portion of a tabular component document database 2200 according to some embodiments. The table may include, for example, entries associated with potential insurance coverages that might be selected by a SBO. The table may also define fields 2202, 2204, 2206, 2208, 2210 for each of the entries. The fields 2202, 2204, 2206, 2208, 2210 may, according to some embodiments, specify: a coverage identifier 2202, a coverage name 2204, a limit 2206, exclusions 2208, and definitions 2210. The component document database 2200 may be created and updated, for example, based on information electrically received from an insurance enterprise (e.g., an underwriter).

The coverage identifier 2202 may be, for example, a unique alphanumeric code identifying an optional insurance coverage and may be based on or associated with the selected coverages 2108 in the potential risk relationship database 2100. The coverage name 2204 may describe the type of insurance coverage and the limit 2206 might define a monetary value associated with the coverage. The exclusions 2208 and definitions 2210 (along with other document components) may represent the language that will be used to assemble the final insurance policy. The exclusions 2208 and definitions 2210 might comprise, for example, a text file, a link to a document, a document identifier, etc.

Figure 23:
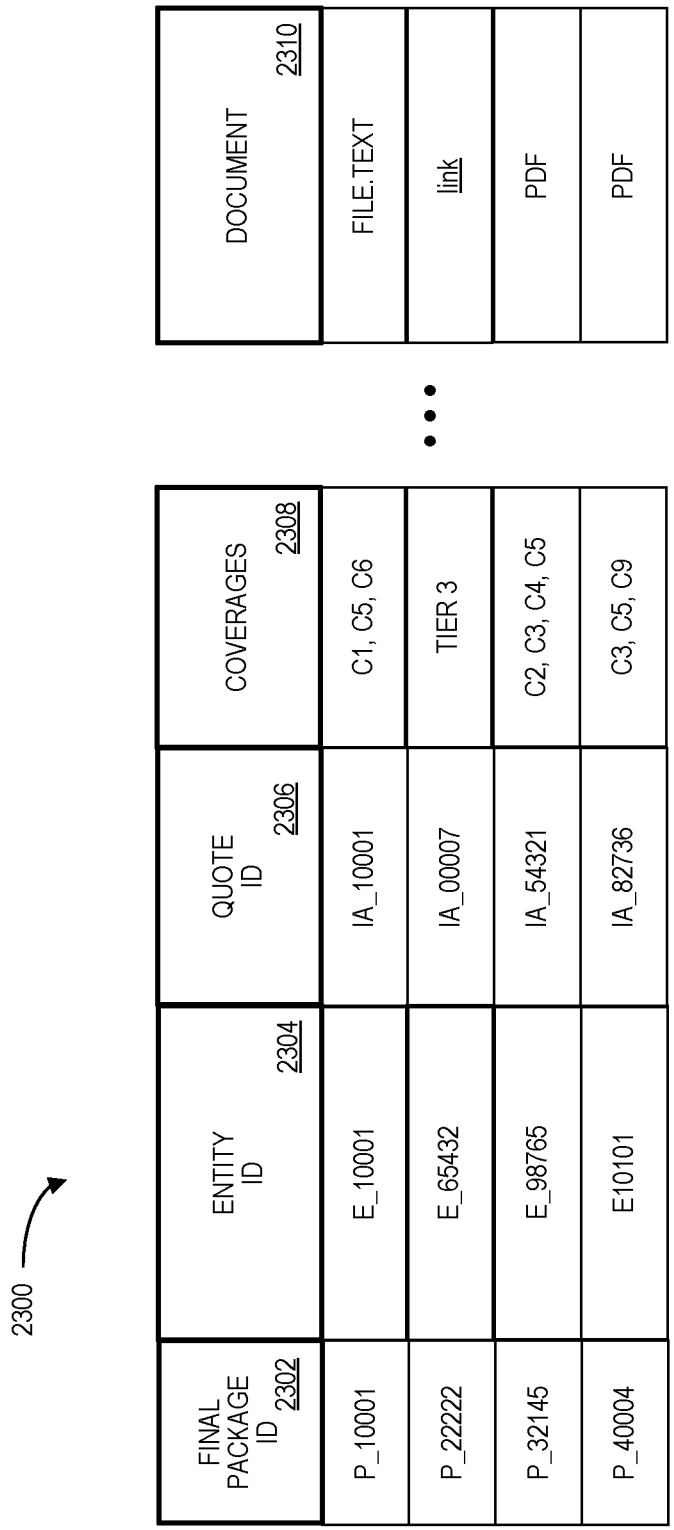
FIG. 23 is a portion of a tabular final package document according to some embodiments.

FIG. 23 is a portion of a tabular final package document database 2300 according to some embodiments. The table may include, for example, entries associated with final insurance policy documents for a SBO. The table may also define fields 2302, 2304, 2306, 2308, 2310 for each of the entries. The fields 2302, 2304, 2306, 2308, 2310 may, according to some embodiments, specify: a final package identifier 2302, an entity identifier 2304, a quote identifier 2306, coverages 2308, and a document 2310. The final package document database 2300 may be created and updated, for example, based on information electrically received from a remote entity device and component documents.

The final package identifier 2302 may be, for example, a unique alphanumeric code identifying a final insurance policy document for a SBO. The entity identifier 2304 may be, for example, a unique alphanumeric code identifying an entity to be insured and may be based on, or associated with, entity identifier 1902 in the entity database 1900 and/or the entity identifier 2104 in the potential risk relationship database 2100. The quote identifier 2306 may be associated with a particular request from the SBO and might be based on, or associated with the quote identifier 2102 in the potential risk relationship database 2100. The coverages 2308 may indicate which optional coverages should be included in the final insurance policy documents and might be based on, or associated with, the selected coverages 2108 in the potential risk relationship database 2100 and/or the coverage identifiers 2202 in the component document database 2200. The document 2310 may contain the final insurance policy documents (e.g., as a test file, link to a document, Portable Document Format ("PDF") file, etc.).

Thus, embodiments may provide an automated and efficient way to create documents in a way that provides faster, more accurate results. Embodiments may also address the need for a consistent and objective determination and comparison of insurance policy attributes.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 24:
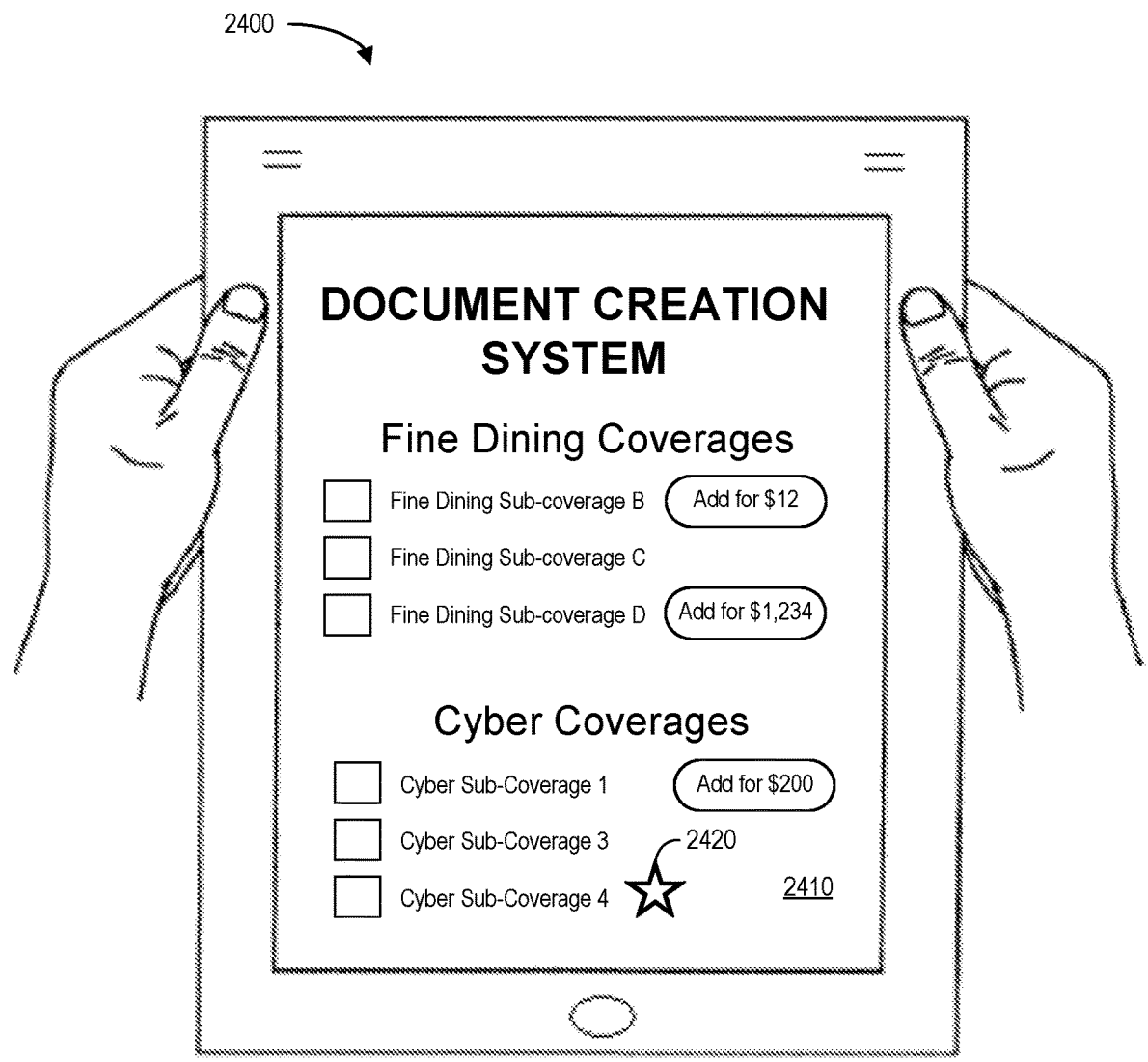
FIG. 24 illustrates a tablet computer displaying a document creation system user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in additional to and/or instead of the policies described herein (e.g., workers' compensation policies, automobile insurance policies, etc.). Similarly, although certain insurance policy attributes were described in connection some embodiments herein, other types of attributes might be used instead. Still further, the displays and devices illustrated herein are only provided as examples, and embodiments may be associated with any other types of user interfaces. For example, FIG. 24 illustrates a handheld tablet computer 2400 showing a document creation system display 2410 according to some embodiments. The document creation system display 2410 might include user-selectable elements that can be selected by a user of the handheld computer 2400 to select optional insurance coverages to be associated with a final insurance policy document. According to some embodiments, the display 2410 may include an icon 2420 indicating that the enterprise recommends or suggests particular coverages.

Embodiments have been described with respect to certain optional types of insurance coverages, but note that any other optional coverage might utilize embodiments described herein. For example, embodiments might utilize transit coverage, sewer/drain back-up coverage, non-owned detached trailers coverage, lost keys coverage, green upgrades (e.g., an optional endorsement to repair or rebuild using eco-friendly materials and construction techniques), perishable goods in transit (e.g., an optional endorsement that covers spoilage of perishable goods which are in transit), telephone fraud (e.g., an optional endorsement that covers phone charges incurred as a result of a telephone hacking incident), ordinance and law: business income and extra expense (e.g., an optional endorsement that preserves the period of restoration when an ordinance or law update delays the repair timeframe), leasehold interest: bonus payments, prepaid rent, sublease profit, tenant's lease interest (e.g., an optional endorsement that packages tenant exposures related to lease termination), liability worldwide coverage (e.g., an optional endorsement that expands the coverage territory to all parts of the world), etc.

Figure 25:
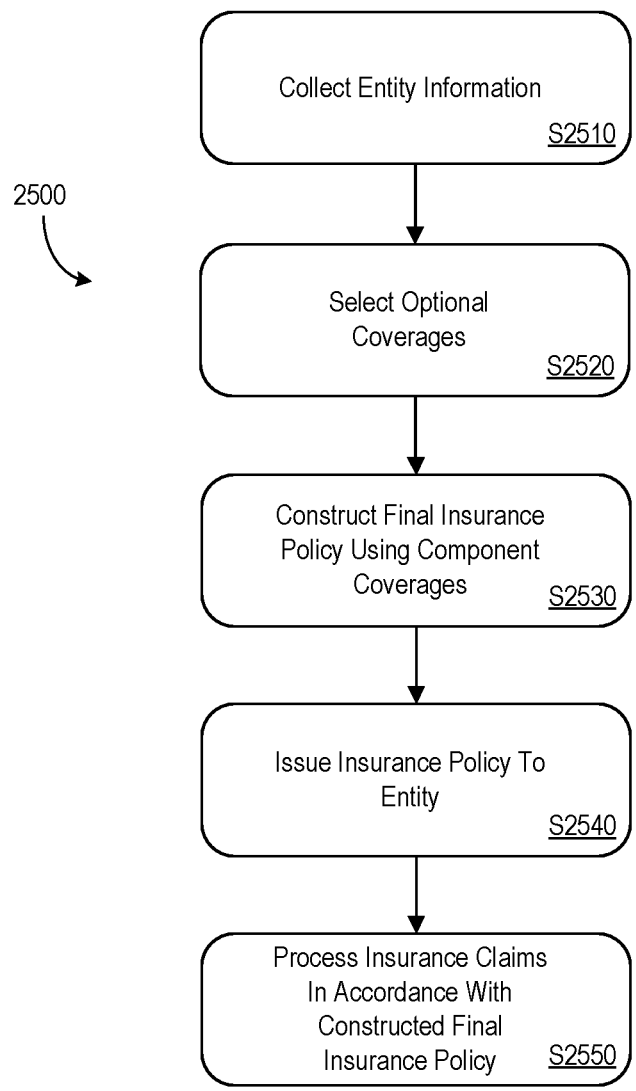
FIG. 25 illustrates an overall process in accordance with some embodiments.

FIG. 25 illustrates an overall process 2500 in accordance with some embodiments. At S2510, an enterprise may collect information about an entity (e.g., a SBO who has requested an insurance quote). At S2520, the entity may select one or more optional insurance coverages, bundles, tiers of protection, etc. At S2530, the enterprise may construct a final insurance policy using component coverages (e.g., pre-generated documents that have been approved by a state regulatory authority). At S2540, the insurance policy may be sold and issued to the entity. At S2550, the enterprise may process insurance claims in accordance with the constructed final insurance policy.

Although particular bundles and types of bundles have been described herein as examples, note that embodiments may be other sets of optional insurance coverages. For example, a "You Bundle" might be constructed consisting of all recommended coverages. According to some embodiments, third-party data and/or web analytics to create enhanced coverage recommendations. Similarly, third-party data and/or web analytics may be used to determine enhanced coverage limit recommendations. According to some embodiments, different insurance agencies may create pre-defined, customizable bundles (that may then be shared with other parties) to create a customized quoting experience. According to still other embodiments, a "Fast Path" quote experience may third-party party data and other collected information to present an agent with an entire policy offering (e.g., reducing questions in the quote flow).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A document creation system associated with a potential risk relationship between an enterprise and an entity, comprising:
    (a) a communication port to exchange information with a remote entity device via a distributed communication network and an interactive user interface display;
    (b) a back-end application computer server associated with the enterprise, coupled to the communication port, the back-end application computer server including a computer processor and a memory in communication with the computer processor, the memory storing program instructions for controlling the computer processor, the back-end application computer server further including:
        (i) a data collection engine to exchange information with the remote entity device associated with the entity and store information about the entity in an entity data store;
        (ii) a bundle creation engine to receive the information about the entity from the entity data store and to retrieve additional information about the entity from at least one social network platform and at least one rating agency and to automatically and dynamically create a potential bundle of optional risk relationship components, each optional risk relationship component being associated with an electronic file representing an optional risk relationship component document; said retrieval of additional information facilitating improved decision-making by the enterprise with respect to the entity, said optional risk relationship components retrieved by the bundle creation engine from a component documents data store, said component documents data store containing records that define insurance coverage options, said bundle creation engine determining that some optional risk relationship components are not eligible to be selected for the potential bundle of optional risk relationship components based on a number of employees of the entity, wherein said determining reduces an overall number of electronic messages transmitted via the distributed communication network;
        (iii) a presentation engine to present information about the potential bundle of optional risk relationship components, via the remote entity device, and receive an indication of a selected subset of the potential bundle of optional risk relationship components; and
        (iv) a final document construction engine to automatically construct, based on the selected subset of the potential bundle of optional risk relationship components and associated electronic files representing component documents, an electronic file representing a risk relationship package document,
    wherein an indication of the electronic file representing the risk relationship package document is transmitted from the back-end application computer server to the remote entity device.

2. The system of claim 1, wherein each optional risk relationship component is further associated with a resource value and a total resource value is dynamically updated and presented via the interactive user interface display based on the selected subset of the potential bundle of optional risk relationship components.

3. The system of claim 2, wherein the resource value of at least one optional risk relationship component is based at least in part on selection of another optional risk relationship component.

4. The system of claim 1, wherein the bundle creation engine further determines that at least some optional risk relationship components are not eligible to be selected.

5. The system of claim 4, wherein the bundle creation engine further indicates at least some optional risk relationship components are suggested to be selected.

6. The system of claim 1, wherein the bundle creation engine creates a plurality of potential bundles, each representing a different tier of risk relationship protection.

7. The system of claim 1, wherein information from the entity data store is supplemented with at least one of: (i) third-party data, (ii) governmental data, (iii) payroll data, (iv) credit score data, (v) social media data, and (vi) web analytics.

8. The system of claim 1, wherein the potential risk relationship is associated with a potential insurance policy, the enterprise is associated with an insurance enterprise, the entity is associated with a potential insured, and each optional risk relationship component is associated with an insurance coverage component.

9. The system of claim 8, wherein the information about the entity in the entity data store includes at least one of: (i) an insurance policy identifier, (ii) a name, (iii) a geographic location, (iv) an insurance policy type, (v) an industry class, (vi) an employee count, (vii) annual sales data, and (viii) business personal property data.

10. The system of claim 8, wherein the presentation engine further determines, for at least one insurance coverage component: (i) a deductible amount, (ii) a coverage amount, (iii) an insurance premium, and (iv) a range of potential insurance premiums.

11. A computerized document creation method associated with a potential risk relationship between an enterprise and an entity, comprising:
    exchanging, via a distributed communication network and an interactive user interface display by a data collection engine of a back-end application computer server associated with the enterprise, information with a remote entity device associated with the entity, the back-end application computer server including a computer processor and a memory in communication with the computer processor, the memory storing program instructions for controlling the computer processor;

based on the exchanged information, storing information about the entity in an entity data store;

receiving, by a bundle creation engine of the back-end application computer server, the information about the entity;

retrieving additional information about the entity from at least one social network platform and at least one rating agency, said retrieval of additional information facilitating improved decision-making by the enterprise with respect to the entity;

retrieving optional risk relationship components from a component documents data store, said component documents data store containing records that define insurance coverage options;

automatically and dynamically creating a potential bundle of optional risk relationship components from the retrieved optional risk relationship components, each optional risk relationship component being associated with an electronic file representing an optional risk relationship component document, said creating including determining that some optional risk relationship components are not eligible to be selected for the potential bundle of optional risk relationship components based on a number of employees of the entity, wherein said determining reduces an overall number of electronic messages transmitted via the distributed communication network;

presenting, via the remote entity device by a presentation engine of the back-end application computer server, information about the potential bundle of optional risk relationship components;

receiving, from the remote entity device, an indication of a selected subset of the potential bundle of optional risk relationship components;

based on the selected subset of the potential bundle of optional risk relationship components and associated electronic files representing component documents, automatically constructing, by a final document construction engine of the back-end application server, an electronic file representing a risk relationship package document; and transmitting an indication of the electronic file representing a risk relationship package document to the remote entity device.

12. The method of claim 11, wherein each optional risk relationship component is further associated with a resource value and a total resource value is dynamically updated and presented via the interactive user interface display based on the selected subset of the potential bundle of optional risk relationship components.

13. The method of claim 12, wherein the resource value of at least one optional risk relationship component is based at least in part on selection of another optional risk relationship component.

14. The method of claim 11, wherein the bundle creation engine further determines that at least some optional risk relationship components are not eligible to be selected.

15. The method of claim 11, wherein the bundle creation engine further indicates at least some optional risk relationship components are suggested to be selected.

16. A non-transitory, computer-readable medium storing instructions, that, when executed by a processor, cause the processor to perform a document creation method associated with a potential risk relationship between an enterprise and an entity, the method comprising:

exchanging, via a distributed communication network and an interactive user interface display by a data collection engine of a back-end application computer server associated with the enterprise, information with a remote entity device associated with the entity, the back-end application computer server including a computer processor and a memory in communication with the computer processor, the memory storing program instructions for controlling the computer processor;

based on the exchanged information, storing information about the entity in an entity data store;

receiving, by a bundle creation engine of the back-end application computer server, the information about the entity;

retrieving additional information about the entity from at least one social network platform and at least one rating agency, said retrieval of additional information facilitating improved decision-making by the enterprise with respect to the entity;

retrieving optional risk relationship components from a component documents data store, said component documents data store containing records that define insurance coverage options;

automatically and dynamically creating a potential bundle of optional risk relationship components from the retrieved optional risk relationship components, each optional risk relationship component being associated with an electronic file representing an optional risk relationship component document, said creating including determining that some optional risk relationship components are not eligible to be selected for the potential bundle of optional risk relationship components based on a number of employees of the entity, wherein said determining reduces an overall number of electronic messages transmitted via the distributed communication network;

presenting, via the remote entity device by a presentation engine of the back-end application computer server, information about the potential bundle of optional risk relationship components;

receiving, from the remote entity device, an indication of a selected subset of the potential bundle of optional risk relationship components;

based on the selected subset of the potential bundle of optional risk relationship components and associated electronic files representing component documents, automatically constructing, by a final document construction engine of the back-end application server, an electronic file representing a risk relationship package document; and transmitting an indication of the electronic file representing a risk relationship package document to the remote entity device.

17. The medium of claim 16, wherein the potential risk relationship is associated with a potential insurance policy, the enterprise is associated with an insurance enterprise, the entity is associated with a potential insured, and each optional risk relationship component is associated with an insurance coverage component.

18. The medium of claim 16, wherein the information about the entity in the entity data store includes at least one of: (i) an insurance policy identifier, (ii) a name, (iii) a geographic location, (iv) an insurance policy type, (v) an industry class, (vi) an employee count, (vii) annual sales data, and (viii) business personal property data.

19. The medium of claim 16, wherein the presentation engine further determines, for at least one insurance coverage component: (i) a deductible amount, (ii) a coverage amount, (iii) an insurance premium, and (iv) a range of potential insurance premiums.

* * * * *